United States Patent
Alldredge et al.

(10) Patent No.: US 9,327,782 B2
(45) Date of Patent: May 3, 2016

(54) FIFTH WHEEL LOCKING MECHANISM

(71) Applicant: Fontaine Fifth Wheel, Trussville, AL (US)

(72) Inventors: Steven Michael Alldredge, Cullman, AL (US); Robert Todd Shelton, Trussville, AL (US); Charles Leon Rosato, Pell City, AL (US); Timothy Norman Johnson, Freeport, ME (US); James H. Adams, Jasper, AL (US); Robert Keith Laney, Vinemont, AL (US); Carl Brent Gaufin, Hanceville, AL (US); Thomas David Hewer, Cullman, AL (US)

(73) Assignee: Fontaine Fifth Wheel, Trussville, AL (US)

( * ) Notice: Subject to any disclaimer, the term of this patent is extended or adjusted under 35 U.S.C. 154(b) by 0 days.

(21) Appl. No.: 14/313,714

(22) Filed: Jun. 24, 2014

(65) Prior Publication Data

US 2015/0158535 A1 Jun. 11, 2015

Related U.S. Application Data

(63) Continuation-in-part of application No. 14/100,417, filed on Dec. 9, 2013.

(51) Int. Cl.
*B62D 53/08* (2006.01)
*B62D 53/10* (2006.01)

(52) U.S. Cl.
CPC ............ *B62D 53/0885* (2013.01); *B62D 53/08* (2013.01); *B62D 53/10* (2013.01)

(58) Field of Classification Search
CPC ..... B62D 53/08; B62D 53/0885; B62D 53/10
See application file for complete search history.

(56) References Cited

U.S. PATENT DOCUMENTS

| | | | | |
|---|---|---|---|---|
| 2,885,222 A | * | 5/1959 | Walther, Sr. et al. | 280/436 |
| 5,263,856 A | * | 11/1993 | Huehn et al. | 384/421 |
| 2004/0145150 A1 | * | 7/2004 | Yeakel | 280/433 |
| 2007/0209879 A1 | * | 9/2007 | Schmidt et al. | 184/6.19 |
| 2011/0025019 A1 | * | 2/2011 | Schmidt et al. | 280/504 |
| 2012/0018977 A1 | * | 1/2012 | Stanifer et al. | 280/433 |
| 2014/0008893 A1 | * | 1/2014 | Loukus et al. | 280/433 |

* cited by examiner

*Primary Examiner* — Tony Winner
(74) *Attorney, Agent, or Firm* — Andrus Intellectual Property Law, LLP

(57) ABSTRACT

A fifth wheel includes a top plate having a throat that is adapted to receive a kingpin of a trailer. The fifth wheel is equipped with a locking mechanism including a jaw slidably connected to the top plate and slidable between a closed position where the jaw blocks passage of a kingpin out of the throat of the fifth wheel and an open position where a kingpin may pass into and out of the throat of the fifth wheel. The jaw has an edge adapted to engage a kingpin positioned in the throat of the fifth wheel when the jaw is in the closed position. A bias device urges the jaw towards the closed position. The fifth wheel further includes a mechanism for moving the jaw between the open and closed positions. Further, the top plate of the fifth wheel is configured to allow service and/or replacement of the jaw from the top of the fifth wheel while it is assembled to a vehicle.

29 Claims, 17 Drawing Sheets

FIFTH WHEEL LOCKING MECHANISM

CROSS REFERENCE TO RELATED APPLICATION

This application is a continuation-in-part of U.S. patent application Ser. No. 14/100,417, filed on Dec. 9, 2013.

FIELD OF THE INVENTION

The present invention relates generally to fifth wheels of the type used by tractor trucks to pull trailers and the like and, in particular, to a locking mechanism for a fifth wheel.

BACKGROUND

Towing vehicles, such as tractor trucks or semi-tractors and the like, are equipped with fifth wheel hitches which receive and engage the kingpins of trailers. The fifth wheel is positioned on the back of the tractor truck and features a top plate having a central throat equipped with a latching mechanism which engages the kingpin. The throat may be, for example, provided with an open end facing the rear of the truck. The kingpin extends downward from the underside of the leading end portion of the trailer. The engagement of the trailer kingpin by the fifth wheel is the primary means by which the trailer is pivotally connected to the tractor.

Terminal tractors, which may be tractor trucks or other vehicles equipped with a fifth wheel, are typically used to move trailers within a cargo yard, warehouse facility, or intermodal facility, as opposed to moving trailers on public roads. Terminal tractors serve a function in the trucking industry that is similar to switch engines or shunting locomotives in the railroad industry. The fifth wheels of terminal tractors are therefore subject to much more frequent hitching and unhitching operations than highway tractors. As a result, a need exists for fifth wheel locking mechanisms for terminal tractors, and similar applications, that are very robust, reliable and quick and easy to hitch and unhitch. It is also desirable for such fifth wheels to prevent, or at least minimize, false locking cases.

DETAILED DESCRIPTION OF EMBODIMENTS

Figure 1:
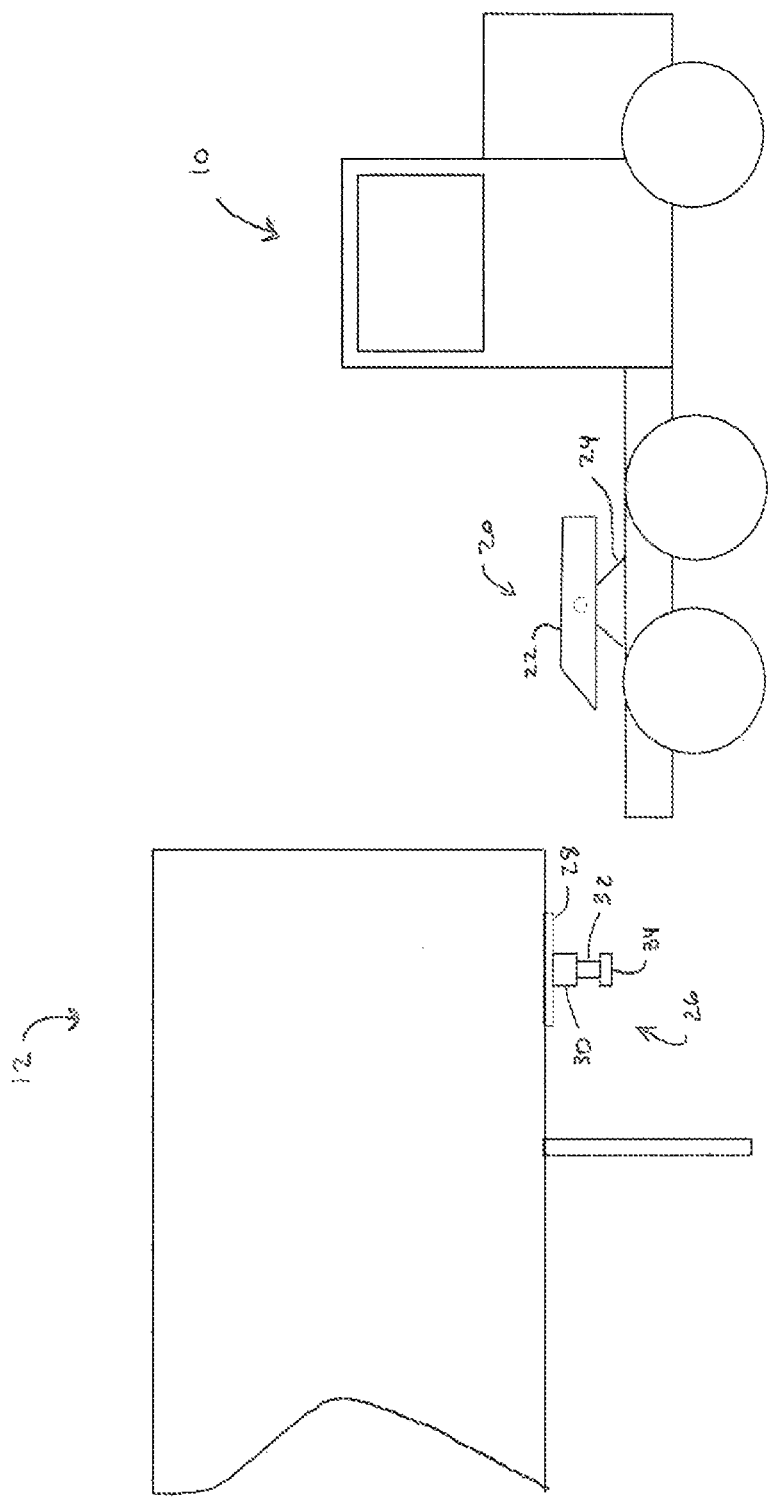
FIG. 1 is a simplified side elevational view of a tractor truck having a fifth wheel and a front portion of a trailer having a kingpin suitable for use with an embodiment of the fifth wheel locking mechanism of the present invention.

In accordance with an embodiment of the present invention, as illustrated in FIG. 1, a towing vehicle, such as a tractor truck indicated in general at 10, is positioned to begin the coupling process with regard to a trailer, indicated in general at 12. While the invention is described below in terms of a tractor truck being used as the towing vehicle and a semi-trailer being used as the trailer, it is to be understood that the present invention could be applied to other towing vehicle and trailer arrangements.

As illustrated in FIG. 1, and as known in the art, the truck is provided with a fifth wheel hitch, or simply "fifth wheel" indicated in general at 20, having a top plate 22 and a base 24 upon which the top plate is pivotally mounted. As is known in the art, the fifth wheel may be mounted in a fixed fashion on the truck frame rails or via a sliding mechanism so that the fore and aft position of the fifth wheel on the truck frame rails may be adjusted.

The trailer 12 features a kingpin, indicated in general at 26. The kingpin typically extends downward from a trailer bearing plate 28 which rests upon the top surface of the top plate 22 of the fifth wheel when the kingpin is received within the fifth wheel as described below. The kingpin typically features an upper collar portion 30, a middle shank portion 32, which features a reduced diameter, and a bottom flange portion 34.

Figure 2:
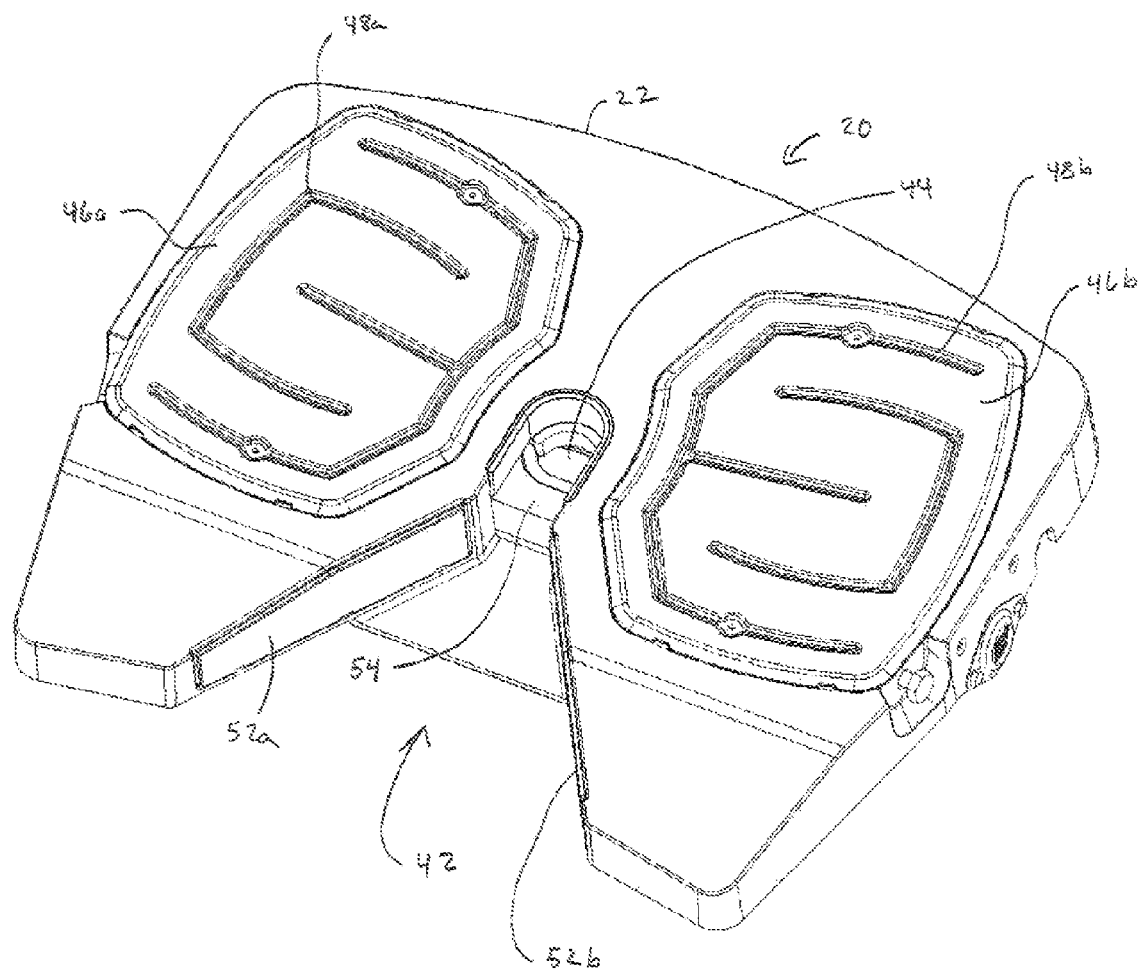
FIG. 2 is a top perspective view of a fifth wheel in an embodiment of the invention with the locking mechanism in a closed configuration.

As illustrated in FIG. 2, the fifth wheel top plate 22 is provided with a rearward facing, generally V-shaped opening or mouth, indicated in general at 42, that leads to the fifth wheel throat 44. As described in greater detail below, the fifth wheel is provided with a locking mechanism that automatically and/or manually engages and locks the trailer kingpin within the throat of the fifth wheel to couple the trailer to the tractor truck.

Figure 11:
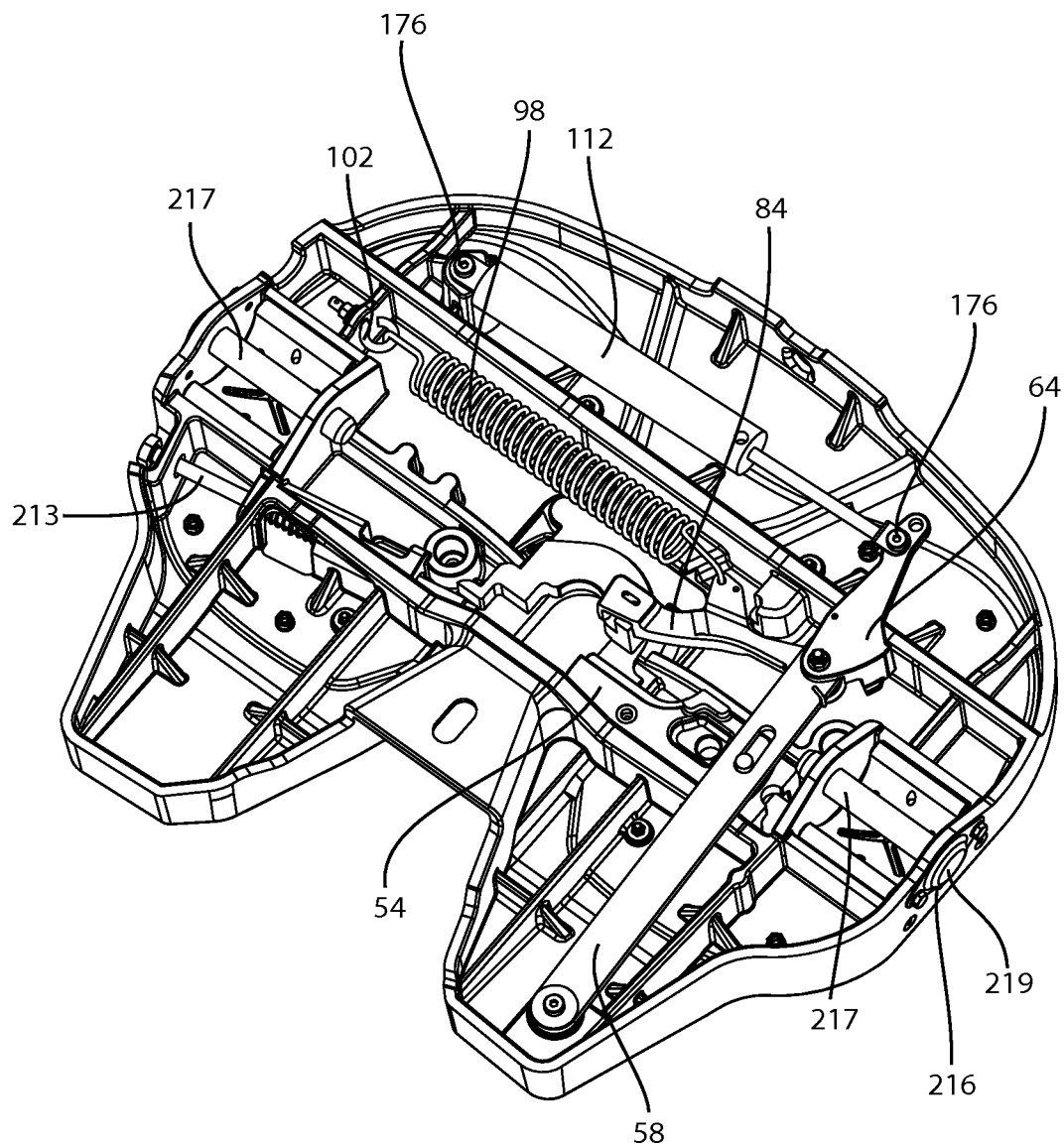
FIG. 11 is a bottom perspective view of an alternative design of the fifth wheel of FIG. 2 in the unlocked position.
Figure 12:
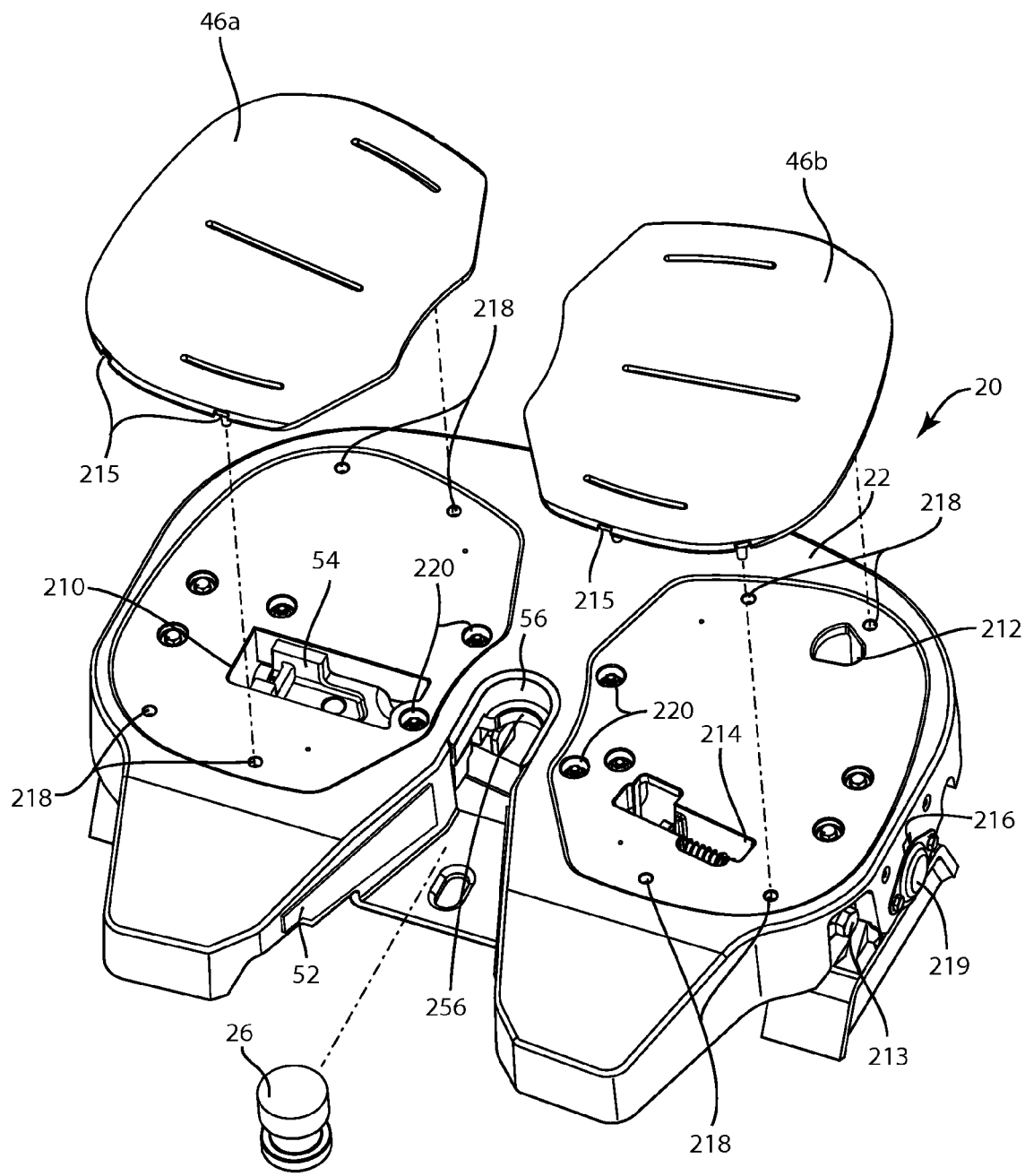
FIG. 12 is a top perspective view of an alternate design of the fifth wheel of FIG. 2 with the top wear plates removed.

The top surface of the top plate 22 is provided with top wear plates 46a and 46b, which preferably include grease grooves 48a and 48b for optimally retaining applied grease. Mouth wear plates 52a and 52b are affixed to the inside surfaces of the mouth of the fifth wheel. As shown in FIGS. 11 and 12, and as further described herein, top wear plates 46a and 46b are removable in some embodiments.

Figure 3:
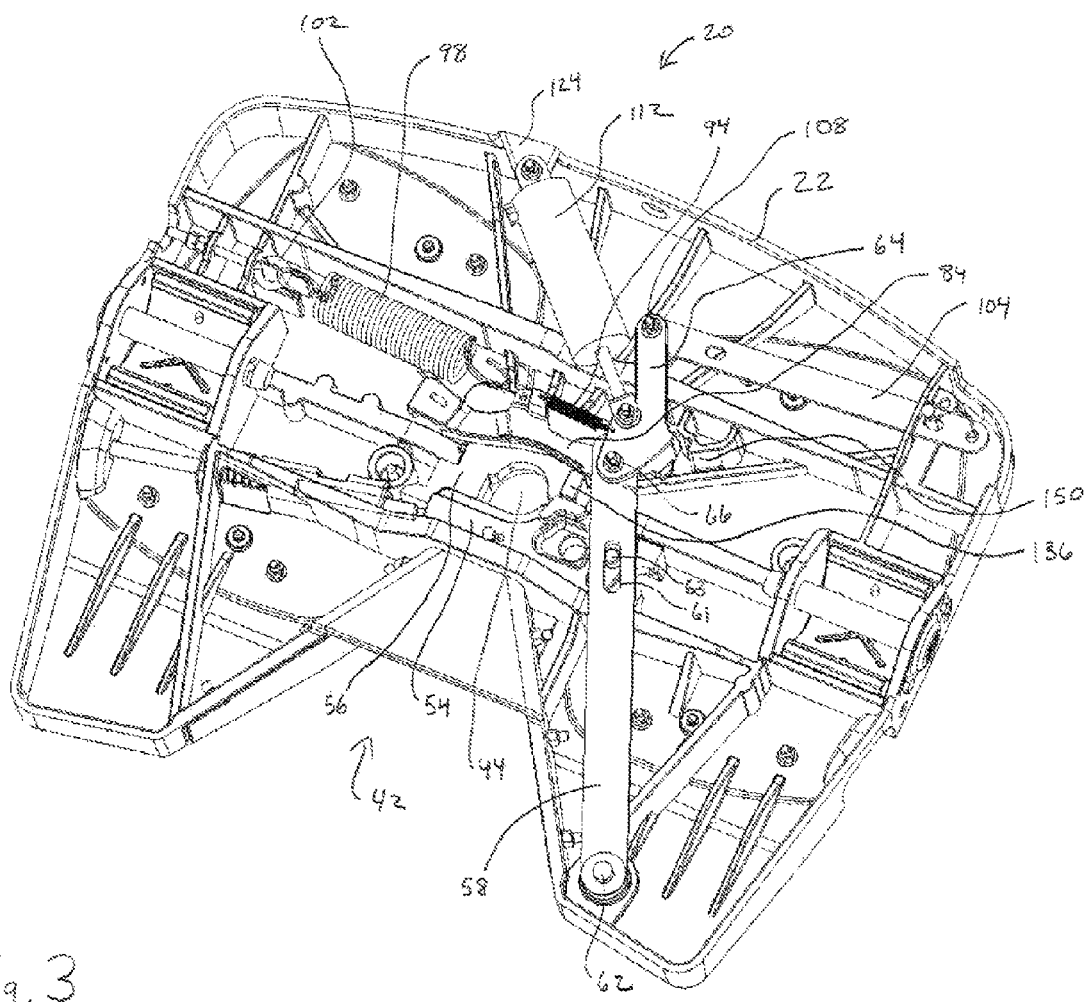
FIG. 3 is a bottom perspective view of the fifth wheel of FIG. 2.

As illustrated in FIG. 3, a locking mechanism is mounted to the underside of the top plate 22. The locking mechanism uses a sliding deadbolt or jaw 54 to lock a trailer kingpin into the throat of the fifth wheel. The locking mechanism is spring loaded in the closed configuration, illustrated in FIGS. 2 and 3. The jaw 54 cooperates with a stationary front jaw or member 56 to hold the kingpin in place during transit. In one embodiment, the front jaw member 56 is removable.

In addition to sliding jaw 54, the locking mechanism includes a release arm 58 that is pivotally connected by a proximal end to the underside of the top plate, such as by bolt 62. The release arm 58 includes an elongated slot 61 which receives a pin 63 that is attached to the jaw As a result, as the release arm pivots about bolt 62, the jaw 54 slides between a closed position, where the passageway between the fifth wheel mouth and throat is blocked, illustrated in FIGS. 2 and 3, and an open position, where the passageway between the fifth wheel mouth and throat is not blocked.

Figure 4:
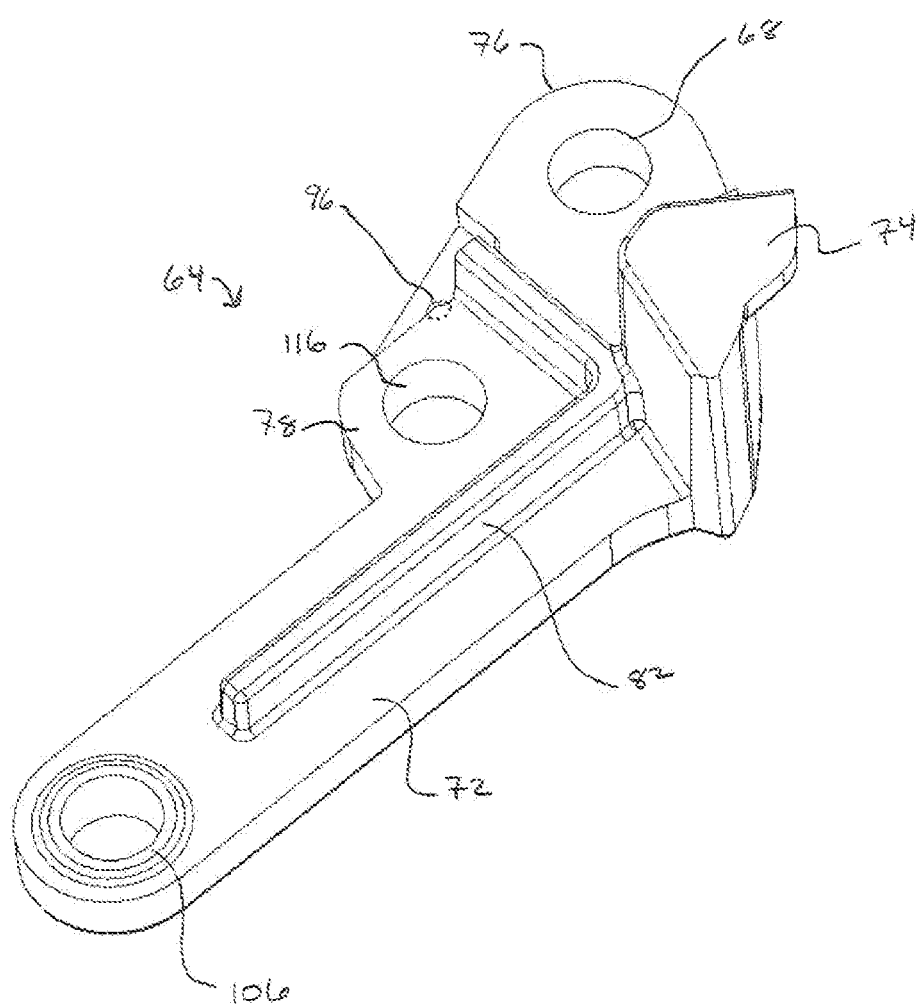
FIG. 4 is an enlarged isolated perspective view of the secondary lock latch of FIG. 3.

A secondary lock latch 64 is pivotally connected to a distal end of the release arm by a bolt 66, which engages an opening 68 (FIG. 4) formed in the latch 64. In addition to opening 68, with reference to FIG. 4, the secondary lock latch 64 includes a pull arm 72, a secondary lock pawl 74 and an elbow portion 76. Positioned between the pull arm and the elbow portion is a corner portion 78. A strengthening rib 82 is preferably provided along at least a portion of the pull arm 72 and between the elbow and corner portions 76 and 78.

Figure 5:
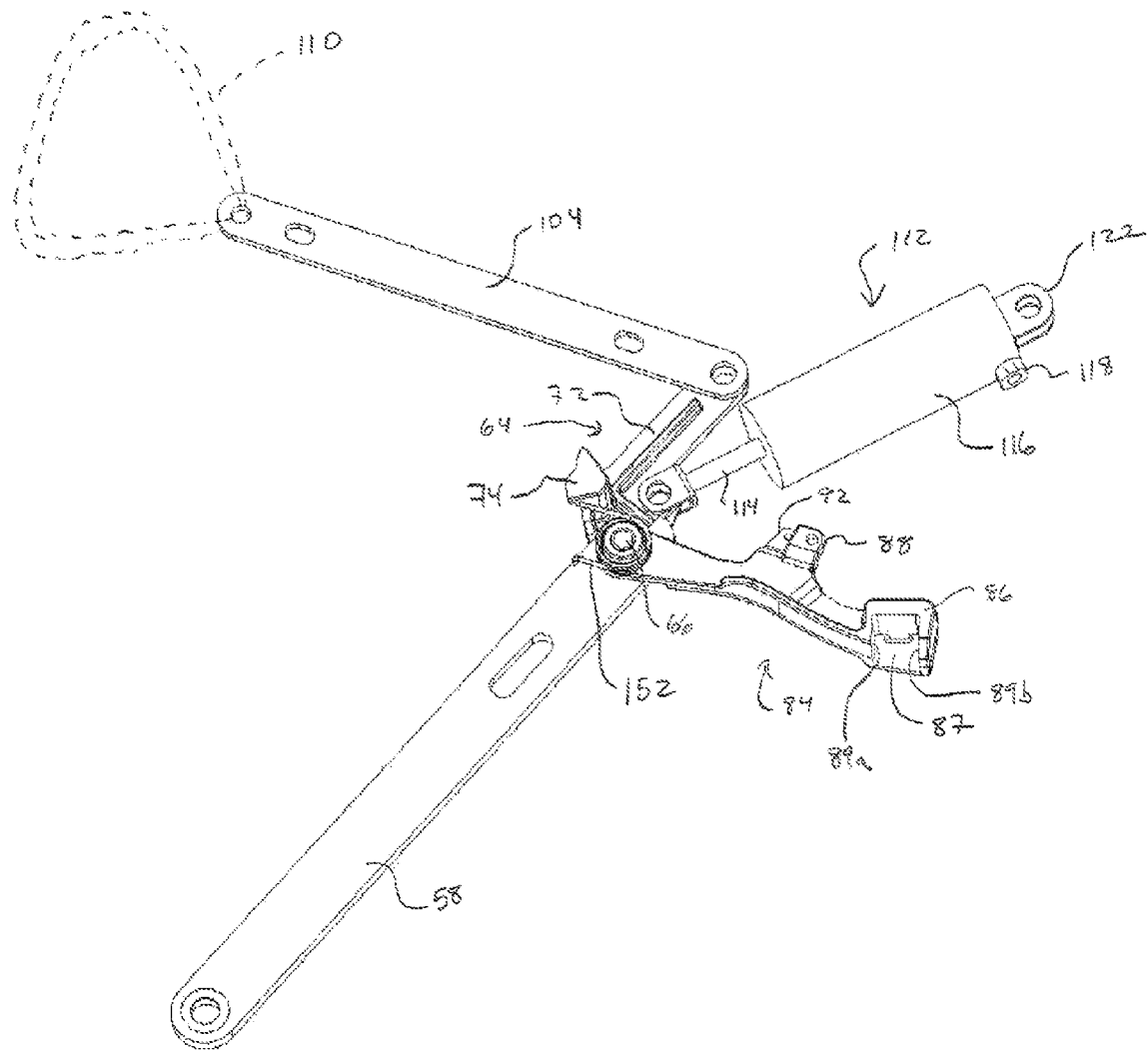
FIG. 5 is an enlarged isolated perspective view of the assembled release arm, secondary lock latch, trigger member, manual release bar and pneumatic release cylinder of FIG. 3.

Returning to FIG. 3, a trigger member 84 is also pivotally attached by a proximal end to the release arm 58 by bolt 66. As illustrated in FIG. 5, the trigger member 84 includes a locking head portion 86 at a distal end that contains a locking socket 87, having proximal wall 89a and distal wall 89b. The trigger member also includes a middle portion provided with tabs 88 and 92, both of which are provided with openings.

As illustrated in FIG. 3, a tension spring 94 has a first end connected to the opening of trigger member tab 92 and a second end attached to opening 96 (FIG. 4) of the secondary lock latch 64. A bias device for urging the jaw 54 toward a closed position, such as a larger main tension spring 98 (FIG. 3) engages the opening of trigger member tab 88 (FIG. 5) at a first end, while, as illustrated in FIG. 3, the second end of the main spring 98 engages an eye bolt 102 secured to the top plate 22. It should be noted that the first end of the main spring 98 is shown disconnected from the opening of tab 88 of the release member in FIG. 3 to improve clarity of the illustration.

As illustrated in FIGS. 3 and 5, a manual release bar 104 is pivotally attached at a proximal end to opening 106 (FIG. 4) of latch 64 via bolt 108 (FIG. 3). The distal end of the manual release bar 104 is preferably provided with a release handle, illustrated in phantom at 110 in FIG. 5, that extends out from under the fifth wheel top plate 22 for access by a user.

A pneumatic release cylinder 112 (FIGS. 3 and 5) features a piston rod 114 that is pivotally attached to opening 116 (FIG. 4) of the corner portion of the latch 64. As illustrated in FIG. 5, the cylinder portion 116 of the pneumatic release cylinder includes a port 118 through which pressure within the cylinder may be increased or decreased to move the piston rod. The port 118 is connected to a source of pressurized air, which may be activated or deactivated by the user to control actuation of the pneumatic release cylinder, and thus the locking mechanism, as will be described in greater detail below. The pneumatic release cylinder includes a tab 122 which is pivotally mounted to a bracket 124 (FIG. 3) formed within or attached to the top plate.

Figure 6A:
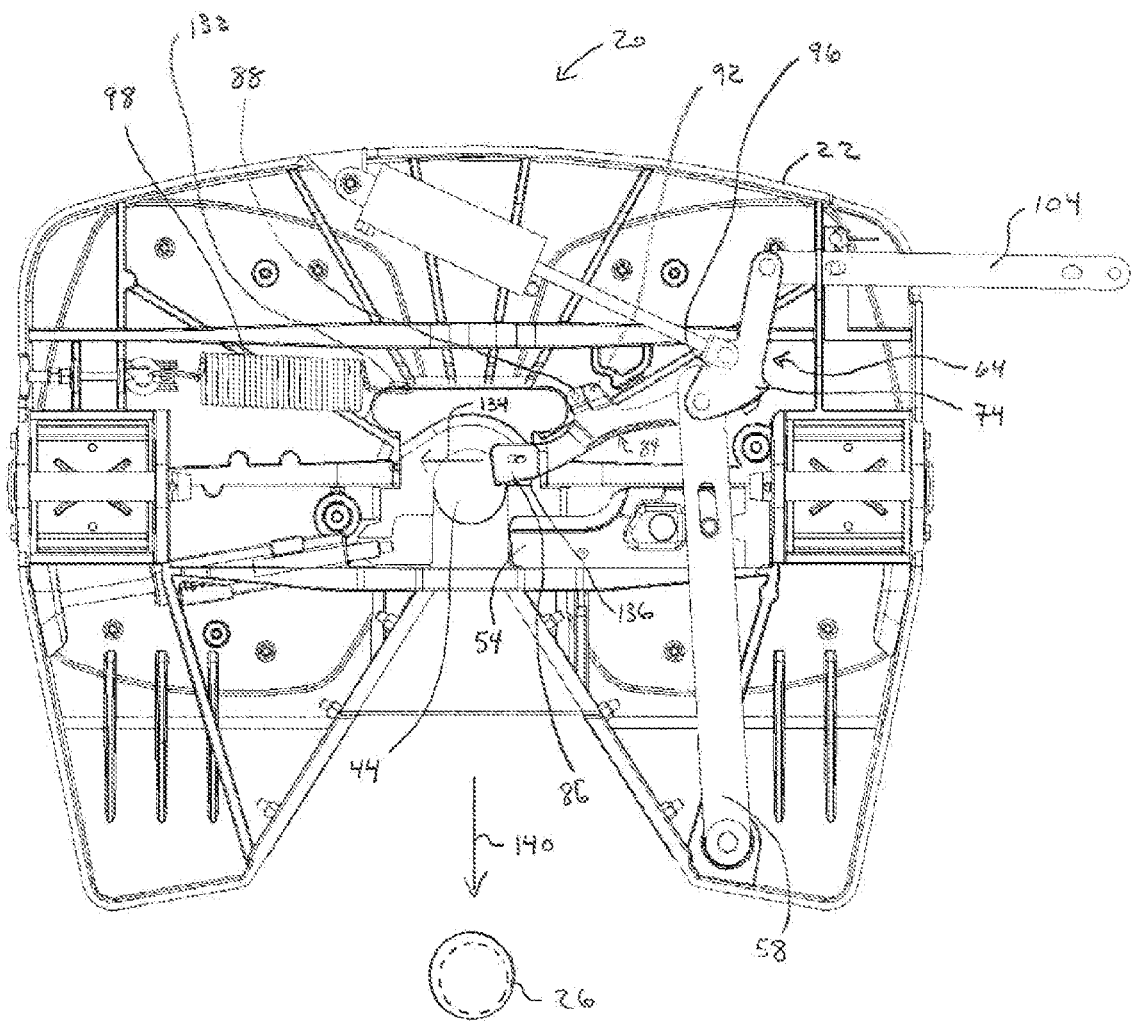
FIGS. 6A-6C are bottom plan views of the fifth wheel of FIGS. 2 and 3 with the locking mechanism in an open and armed, opened and unarmed and closed configurations, respectively.

In operation, the locking mechanism described above is initially in the open and armed configuration illustrated in FIG. 6A. More specifically, the fifth wheel is prepared to receive the kingpin of a trailer so that the tractor truck or other pulling vehicle may be coupled to the trailer.

Figure 6B:
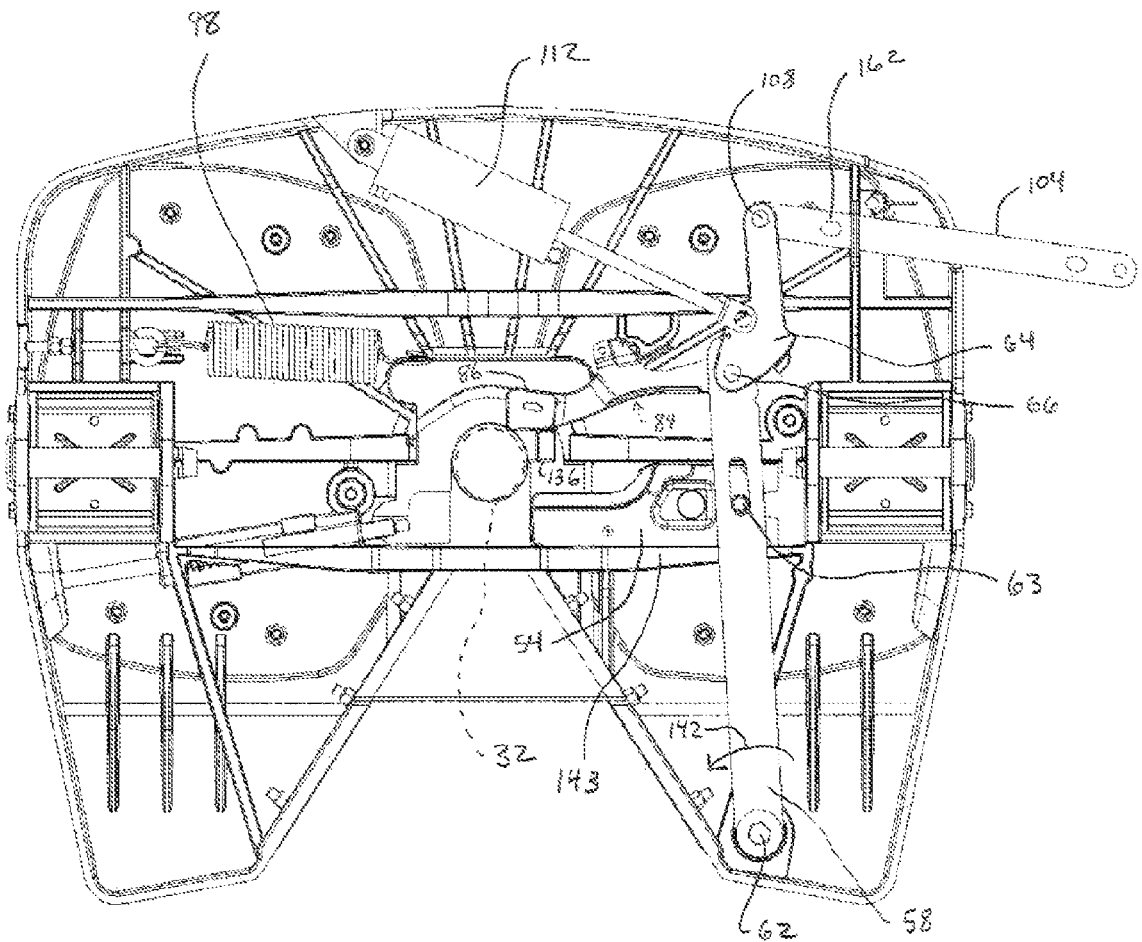
Figure 6C:
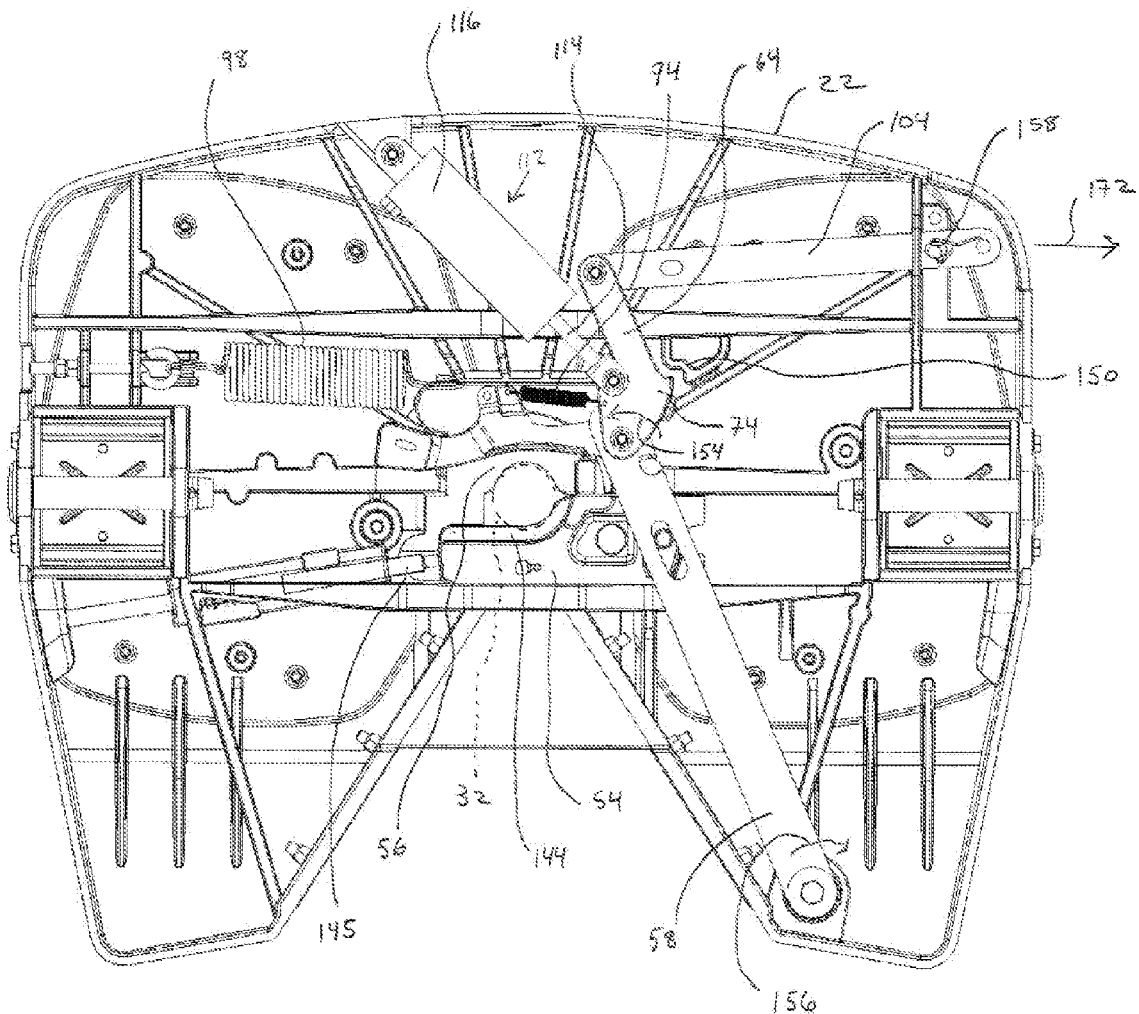

It should be noted that the main tension spring 98 is shown in FIGS. 6A-6C with the first end 132 disconnected from the tab 88 of the trigger member for clarity. In actuality, the first end 132 of the spring 98 is connected to the tab 88 of the trigger member and is actually held in tension when the locking mechanism is in the open and armed configuration illustrated in FIG. 6A. In addition, the tension spring 94 of FIG. 3 has been omitted from FIGS. 6A and 6B for clarity, but it should be understood that the spring is connected between tab 92 of the trigger member and the opening 96 of the secondary lock latch 64. As a result, the spring 94 of FIG. 3 would also be in a tension state in the open and armed configuration of FIG. 6A.

When in the open and armed configuration of FIG. 6A, due to the tension force of main spring 98, the trigger member is pulled in the direction of arrow 134. Motion in this direction is prevented, however, due to the engagement of the proximal wall 89a (FIG. 5) of the locking socket (87 in FIG. 5) of the head 86 of the trigger member with a locking protrusion 136 (also shown in FIG. 3) that extends downward from the bottom surface of the fifth wheel top plate 22. A portion of the head 86 of the trigger member extends into the throat 44 of the fifth wheel.

As a result of the position of the trigger member 84 illustrated in FIG. 6A, the release arm 58 is positioned so that the jaw 54 is held in a position where it does not block the passageway between the fifth wheel mouth 42 and throat 44.

As illustrated in FIG. 1, the fifth wheel 20 is mounted to a tractor truck or other pulling vehicle. To couple a trailer (such as 12 in FIG. 1) to the pulling vehicle, the driver backs the pulling vehicle towards the trailer kingpin 26 as illustrated by arrow 140 in FIG. 6A. As the shank portion of the kingpin 26 enters the throat 44 of the fifth wheel, the flange of the kingpin engages the locking head 86 of the trigger member 84 and moves it to the position illustrated in FIG. 6B (the shank portion 32 of the kingpin is indicated in phantom in FIG. 6B). As a result, the locking socket of the head 86 of the trigger member is moved off of locking protrusion 136, and main spring 98 is free to pull the trigger member in the direction of arrow 134 (of FIG. 6A). As this occurs, the release arm 58 pivots in the direction of arrow 142 of FIG. 6B, and jaw 54 is pushed via pin 63 to slide along sliding support 143 (FIG. 6B) into the closed position illustrated in FIG. 6C (and FIGS. 2 and 3). This results in the locking mechanism being in the closed configuration with the shank portion 32 of the trailer kingpin being locked within the fifth wheel so that the pulling vehicle and trailer are coupled. A micro-switch 145 (FIG. 6C) detects that the jaw 54 is in the closed position and provides a signal to the driver of the pulling vehicle, such as a visual and/or audible in the cab of the pulling vehicle, so that the driver knows the locking mechanism is in the closed configuration.

The jaw 54 preferably includes a tapered and curved edge 144 to facilitate and ensure engagement between the jaw and the kingpin. As the trailer is pulled by the pulling vehicle, towing forces (forces in the direction of the jaw 54) are transmitted directly onto the curved surface 144 of the jaw that interfaces with the kingpin. These forces are distributed over the span of the jaw and transmitted into the top plate 22.

While the closed configuration of FIG. 6C is supported by the force of main spring 98, additional locking is provided by the secondary lock latch 64. More specifically, as the release arm 58 moves from the position illustrated in FIG. 6B to the position illustrated in FIG. 6C, the pawl 74 of the secondary lock latch is moved in a position to engage a locking notch 150 (FIGS. 3 and 6C) formed on the bottom surface of the top plate 22. A torsion spring, illustrated at 152 in FIG. 5, features one end that engages the release arm 58 and another end that engages the pawl portion 74 of the secondary lock latch. The action of the torsion spring, in combination with the tension force of spring 94, causes the latch 64 to pivot about the distal end of the release arm 58 in the direction of arrow 154 of FIG. 6C so that the pawl 74 engages the notch 150. As a result, the release arm 58 is prevented from rotating in the direction of arrow 156 thus further locking the jaw 54 in the closed position illustrated in FIG. 6C. This secondary locking prevents the jaw 54 from retracting from the closed position due to fiction during turning or other potential jarring or impact forces.

An additional tertiary lock is available by way of manually inserting a locking pin 158 (FIG. 6C) into a hole in the top plate 22 as well as an opening 162 (FIG. 6B) formed in the manual release bar 104 in order to create a positive lock between the two. Engaging this tertiary lock prevents the locking mechanism from opening while in transit, even in the event that the pneumatic release cylinder is activated in the manner described below.

When the driver or other user wishes to uncouple the trailer from the pulling vehicle, and thus remove the kingpin from the fifth wheel, the pneumatic release cylinder 112 is activated so that the piston rod 114 moves out of the cylinder 116. This causes the secondary lock latch 64 to rotate about the distal end of the release arm 58 in the clockwise direction (i.e. in the direction opposite of arrow 154). As a result, the pawl 74 of the latch is removed from engagement with notch 150, and the release arm is rotated about bolt 62 in the clockwise direction (i.e. in the direction opposite arrow 142 in FIG. 6B) into the position illustrated in FIG. 7, and the jaw 54 is pulled to the right into the open position. In addition, the head 86 of the trigger member drops down onto the locking protrusion 136 so that the locking protrusion is positioned adjacent to the distal wall 89b (FIG. 5) of the locking socket (87 of FIG. 5). At this point, the locking mechanism is in the open and unarmed configuration.

Figure 7:
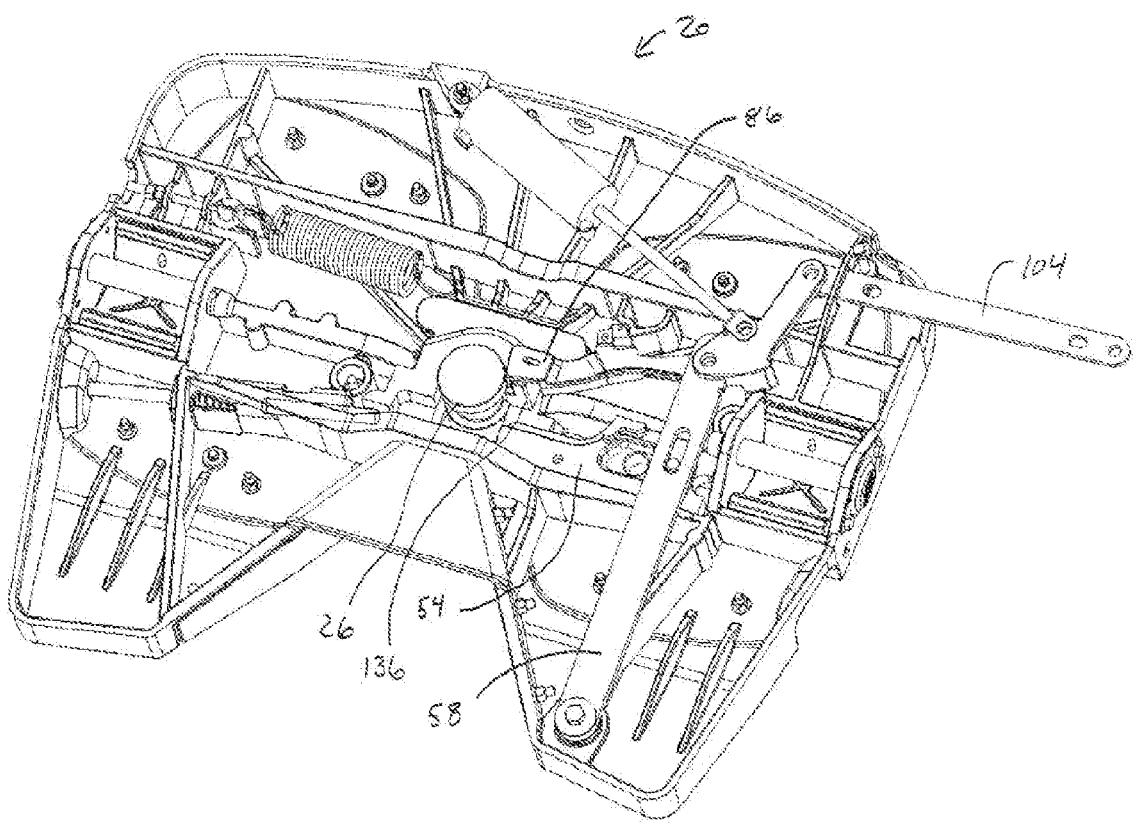
FIG. 7 is a bottom perspective view of the fifth wheel of FIGS. 2, 3 and 6A-6C with the locking mechanism in the open and unarmed configuration.

When in the opened and unarmed configuration illustrated in FIG. 7, the head 86 of the trigger member rests against the flange of the kingpin and holds the mechanism open until the kingpin is removed from the fifth wheel. After the kingpin is removed, and the trailer and the pulling vehicle are uncoupled, the head 86 of the trigger member moves to the left (in the direction of arrow 134 of FIG. 6A) so that the locking protrusion 136 once again engages the proximal wall 89a (FIG. 5) of the locking socket (87 in FIG. 5). As a result, the locking mechanism is once again in the open and armed configuration illustrated in FIG. 6A.

As an alternative to the use of the pneumatic release cylinder 112, or in the event of a failure of the cylinder, there is the option of manually releasing the secondary lock and opening the mechanism via the use of manual release bar 104. More specifically, with reference to FIG. 6C, pulling the manual release bar in the direction of arrow 172 (with tertiary locking pin 158 removed) will cause the secondary lock latch 64 to rotate about the distal end of the release arm 58 in the clockwise direction (i.e. in the direction opposite of arrow 154) so as to disengage the secondary locking pawl allowing the mechanism to move into the opened and unarmed configuration illustrated in FIG. 7 with a single pull.

Figure 8:
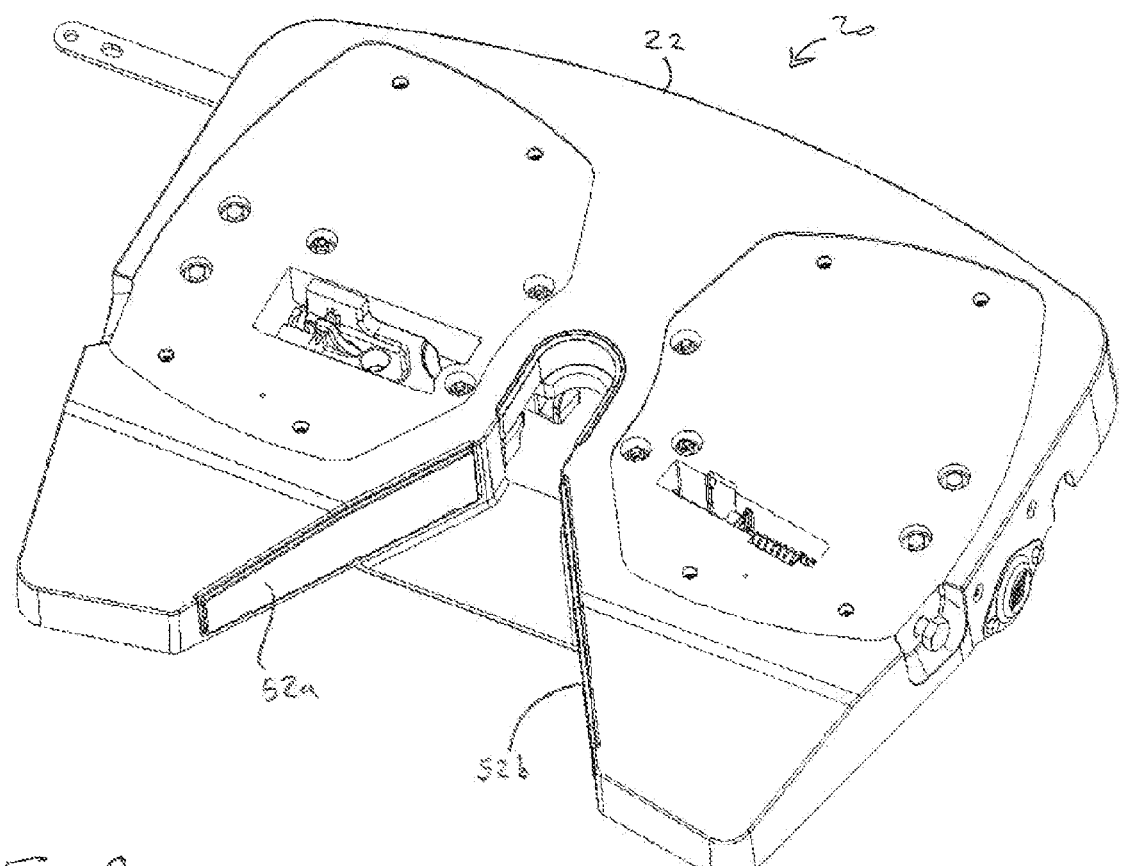
FIG. 8 is top perspective view of the fifth wheel of FIGS. 2, 3 and 6A-6C with the top wear plates removed.
Figure 9:
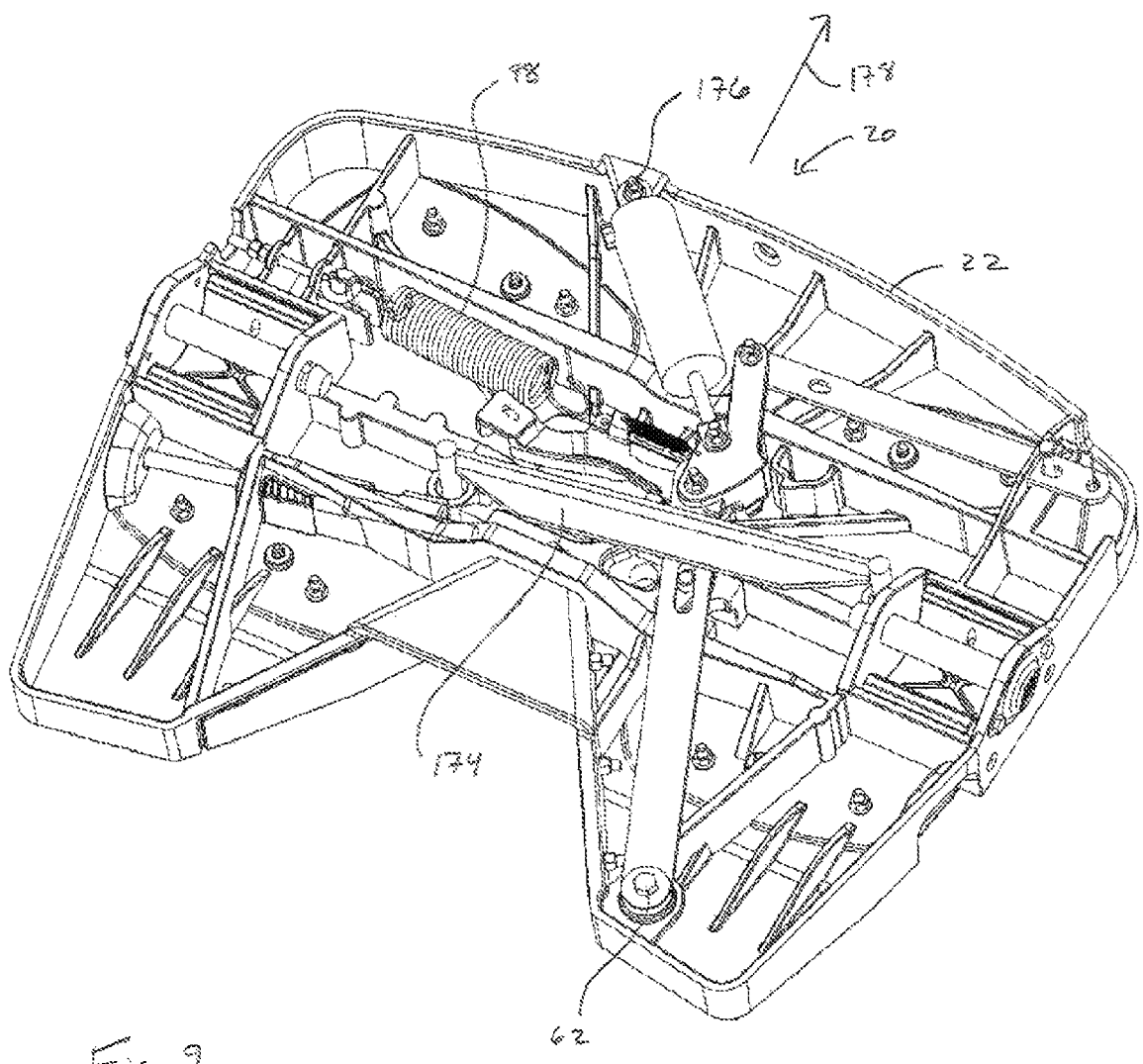
FIG. 9 is a bottom perspective view of the fifth wheel of FIG. 3 with a retaining bracket.

The locking mechanism described above offers several advantages in terms of maintenance and service. The jaw 54 is replaceable while the fifth wheel is assembled to the truck or other pulling vehicle, after removal of the wear plates, which is illustrated in FIG. 8. The internal linkage illustrated in FIG. 5, including the release arm 58, trigger member 84, secondary lock latch 64, manual release bar 104 and pneumatic cylinder 112, can be replaced after the removal of a retaining bracket 174, illustrated in FIG. 9 as added to the fifth wheel of FIG. 3, and screws 62 and 176 on the bottom perimeter of the top plate 22. The internal linkage may be dropped out the bottom of the fifth wheel and slid forward, in the direction of arrow 178 of FIG. 9, for removal and servicing. The stationary front jaw (56 of FIG. 3) can be removed and replaced after removal of sliding jaw 54, retaining bracket 174 (FIG. 9) and a release bolt and detachment of the main spring 98.

As shown for the top wear plates in FIG. 8, the mouth wear plates 52a and 52b may also be removed from the top plate 22 for repair or replacement.

Accordingly, in one embodiment, top wear plates 46a and 46b are removable as shown in FIG. 12. The top wear plates 46a and 46b are removably attached to the top plate 22 through connections. In one embodiment, the connections include screws located within recessed openings within top plates 46a and 46b as shown in FIG. 2. As shown in FIG. 12, the screws interact with top wear plate connection points 218 to secure the top wear plates 46a and 46b to a top surface of the top plate 22. The top wear plates 46a and 46b cover at least a portion of the top plate 22 and can be released from the top plate 22 once the connectors engaging with top wear plate connection point 218 are removed by applying pressure to pry points 215 (FIG. 12) to provide a lever force in releasing the top wear plates from the top surface of the top plate 22 through use of a screwdriver, crowbar or other implement.

Figure 10:
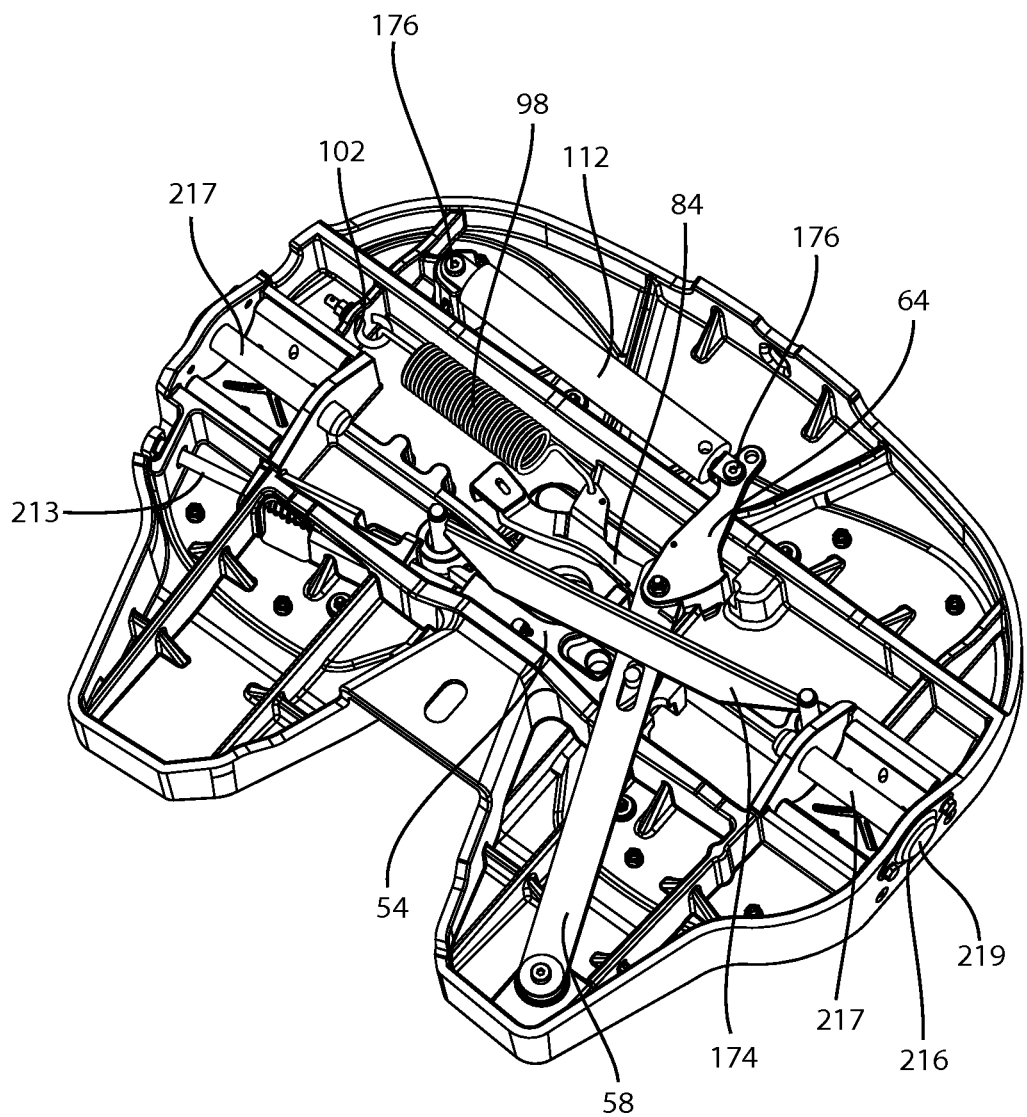
FIG. 10 is a bottom perspective view of an alternate design of the fifth wheel of FIG. 2 in the locked position.

In one embodiment, shown in FIGS. 10-14, the mechanism for moving the jaw between the open position and the closed position is modified to eliminate the manual release bar 104. As shown in FIGS. 10-12, a knockout rod 213 is included in the design to permit loosening of the jaw 54 if it is bound or stuck in a closed position. Knockout rod 213 includes a terminal end exposed at the outer surface of the top plate 22 that can be struck with a hammer or other implement to loosen the jaw 54 when a release cylinder provides insufficient force to move the jaw 54 into the open position.

Figure 13:
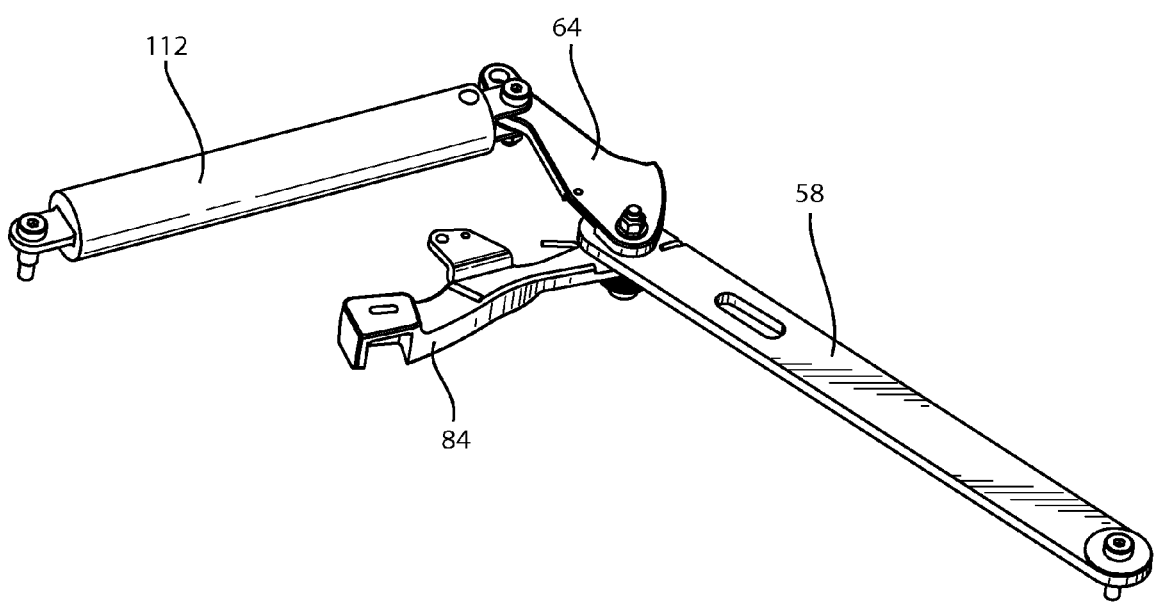
FIG. 13 is a perspective view of an alternate mechanism for moving a jaw.
Figure 14:
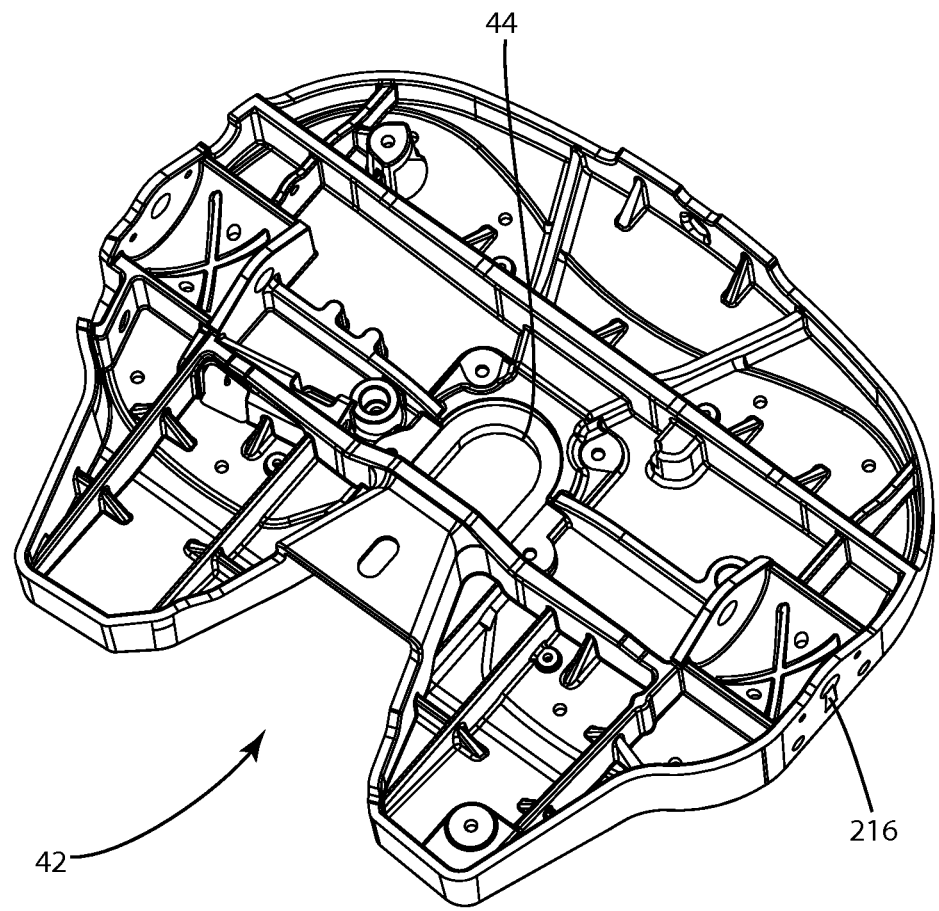
FIG. 14 is a bottom perspective view of a top plate for a fifth wheel.

In an alternative embodiment, the mechanism for moving the jaw 54 comprises the release cylinder 112, the release arm 58, the trigger mechanism 84 and secondary latch 64, as shown in FIG. 13. As shown in FIG. 10, the mechanism for moving the jaw works in conjunction with a bias device, such as main tension spring 98, or other biasing mechanism, such as a pneumatic or hydraulic cylinder, to open and close the jaw 54 as previously described.

As particularly in FIG. 12, removal of top wear plates 46a and 46b expose several service windows to access the components of the fifth wheel from the top surface when the fifth wheel is attached to a trailer, including, but not limited to, jaw service window 210, release cylinder service window 212, and knockout rod service window 214. As will be recognized to those of ordinary skill in the art, additional windows may be added to further access components of the fifth wheel for service.

The jaw service window 210, in one embodiment, is through the top plate 22 from the top surface to the bottom surface and is overlaying the location of the jaw 54 when the jaw 54 is in the open position. As demonstrated in FIG. 15, the jaw 54 includes a hole 225, an edge groove 226, and a wear plate 254. Hole 225 and edge groove 226 help enable an operator to remove the jaw 54 through the jaw service window 210 during servicing. The jaw service window 210 is sized to allow removal of the jaw 54 from the fifth wheel through the jaw service window 210 in the following manner. An operator actuates the release cylinder 112 to move the jaw into the open position as shown in FIG. 11. The tension on the bias device, e.g. 98, is then released. In one embodiment, the bias device is a main tension spring 98 that is connected to a bottom surface of the top plate 22 through a quick release connection. By releasing the quick release connection, the tension on the spring 98 is removed. The left wear pad 46a is then removed to access the jaw service window 210. An operator may reach through the jaw service window 210 and grip the jaw 54 to remove it through jaw service window 210. The jaw 54 may then be repaired or replaced. The new or refurbished jaw 54 is replaced through jaw service window 210. The release cylinder may then be deactivated, and the bias device reactuated to place the fifth wheel back into serviceability.

While this embodiment discusses using a quick release connection from the bias mechanism 98 to the top plate 22, one of ordinary skill in the art will recognize that the quick release mechanism may be used to connect any of the components to the top plate, including connection of the mechanism for moving the jaw and/or the release cylinder, which may also be connected to the bottom surface of the top plate 22 through quick release mechanisms.

Removal of the right top wear pad 46b exposes release cylinder service window 212. As noted, the release cylinder 112 may be a pneumatic cylinder, a hydraulic cylinder or any other cylinder that may be used to actuate the mechanism for moving the jaw 54. Before servicing the release cylinder 112 through the release cylinder service window 212, an operator removes any actuating force from the cylinder 112 so that the jaw 54 remains closed. For example, when the release cylinder 112 is an air cylinder, an air line may be removed so that the jaw 54 may not open. The right wear pad 46b is removed, and screws 176 are loosened on both ends of the cylinder 112. At least one screw 176 is accessible through release cylinder service window 212, making removal and replacement of the release cylinder quick and easy.

Removal of the right top wear plate 46b also exposes knockout rod service window 214. Knockout rod service window 214 allows an operator to grasp the knockout rod 213 during removal and servicing of the knockout rod, should such service be necessary. The knockout rod service window 214 and the top plate 22 overlay at least a portion of the knockout rod 213, and the window is sized to allow a user to grip the knockout rod 213 from the top of the fifth wheel while the fifth wheel is assembled to the vehicle. Thus the removable top wear plates 46a and 46b may cover at least one of the jaw service window 210, the release cylinder service window 212, and/or the knockout rod service window 214.

As shown in FIGS. 10, 11, 12 and 14, the top plate 22 may further comprise a tool insert opening 216 to permit removal of bracket pins 217. The tool insert opening 216 may be a small inset on the side of the top plate 22 to allow the bracket pin 217 and bolt head plate 219 to be pried from the outer side surface of the top plate 22. The tool insert opening 216 allows for insertion of a crowbar, screwdriver or other implement behind the bolt head plate 219, such that the bolt head plate 219 can be pried off and the bracket pin 217 removed. This removability solves problems with prior art fifth wheels where users have trouble removing the bolt head plate 219 and may end up damaging, for example causing microcracks, by hitting the top plate 22 with a hammer or other tool.

Figure 15:
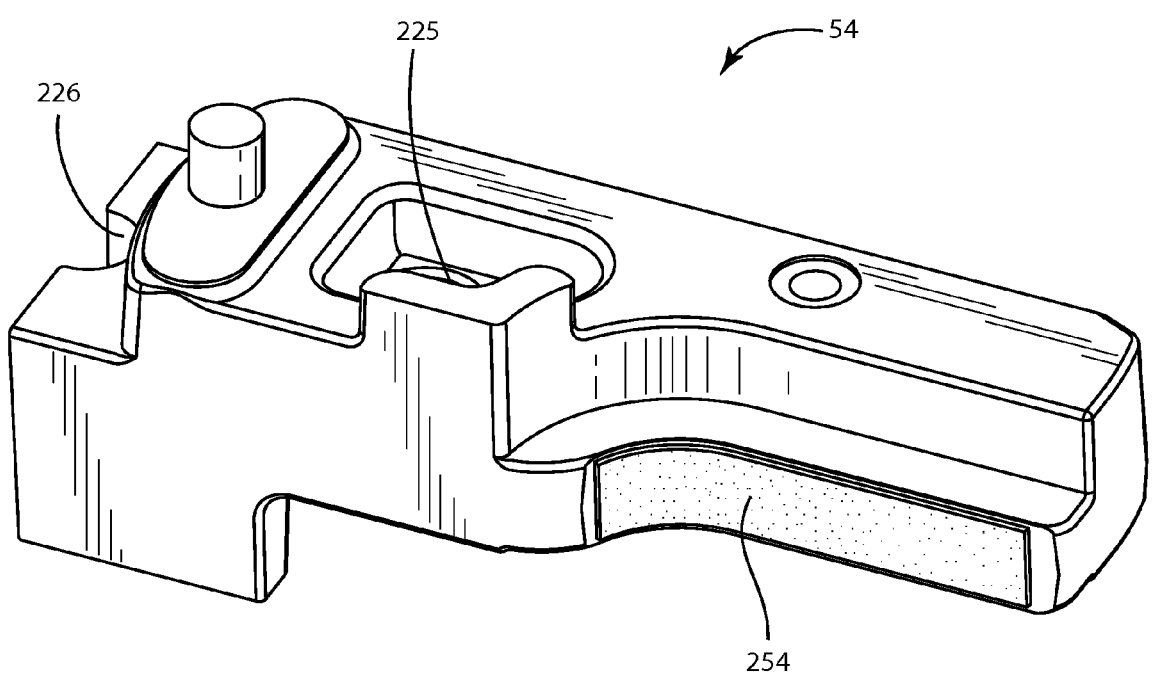
FIG. 15 is a perspective view of a jaw used in a fifth wheel.

As shown in FIGS. 12 and 15, many of the components of the fifth wheel present application may include wear indicators to indicate the wear status of those components. For example, and without limitation, the top wear plates 46a and 46b may include wear indicators on the top surface configured to indicate the wear status of the top plate. For example, and without limitation, these wear plates could include wear plates that are "sandwiched," wherein when a top surface of the "sandwich" is removed through wear, the second layer of the "sandwich" would reveal a colored surface to indicate the wear status of the plate. The "sandwich" could be multiple layers demonstrating different levels of wear. Alternatively, the wear indicator may be grooves that indicate a maximum wear depth. In yet another embodiment, the wear indicator may be a wear strip embedded in the top wear plate that provides a visual indication of maximum wear depth.

Likewise, as shown in FIG. 15, the jaw 54 may include a wear indicator 254 on the edge of the jaw that engages the kingpin 26. The wear indicator 254 may be a wear plate configured to indicate the wear status of the edge. As demonstrated in FIG. 15, the jaw 54 includes a hole 225, an edge groove 226, and a wear plate 254. The hole 225 and edge groove 226 help enable an operator to remove the jaw 54 through the jaw service window 210 during servicing. In alternative embodiments, the wear indicator for the jaw is a groove on a top surface of the jaw 54 positioned to indicate a maximum wear depth at the edge of the jaw where wear plate 254 is located in FIG. 15. In another embodiment, the wear plate 254 is replaced with a wear strip of the "sandwich" type discussed earlier. The wear strip may be embedded in the jaw to provide a visual indication of maximum wear depth of the edge of the jaw 54.

In a similar manner, the front jaw 56 may be removable from the throat 44 and further include a front jaw wear indicator 256 (FIG. 12). Again, that wear indicator would be of the types described above to indicate when replacement of the front jaw is needed. Further, the mouth 42 may include wear plates 52 attached to a side surface of the top plate 22 adjacent to the throat. These mouth wear plates 52 are configured to provide a contact surface for engagement with the kingpin when the kingpin is inserted into or removed from the throat 44. The mouth wear plates 52 may each include a wear indicator configured to indicate the wear status of the mouth wear plate 52. Again, the wear indicators on the mouth wear plates may be any type of indicator that indicates a status of the mouth wear plate, including a groove positioned on a visible surface of the mouth ear plate to indicate a maximum wear depth, or a wear strip embedded in the mouth wear plate that provides a visual indication of the maximum wear depth.

The fifth wheel of the present application may also include the addition of data collection devices such as a coupling counter, weight scale, or any other data collection devices of the type known in the art located within the bottom surface of the top plate 22. The data collection device may be any type of data collection device that could track and any all data related to the fifth wheel and/or the towing capabilities or the activities that have been conducted. Such data collection devices include, but are not limited to, scales on the on the fifth wheel to detect or calculate weight, counters for determining the number of connections, distance towed, average towed weight, etc. By including the data collection device, along with all the other components shown in FIGS. 10-14 within the outer circumference of the top surface 22 of the fifth wheel, no external parts are protruding outside the plate during operation. Thus, there are no parts subject to damage during use, such as getting damaged by a kingpin with a botched connection. With all components contained within the top plate for protection, the fifth wheel of the present application provides a robust and easily serviceable design.

While the preferred embodiments of the invention have been shown and described, it will be apparent to those skilled in the art that changes and modifications may be made therein without departing from the spirit of the invention, the scope of which is defined by the appended claims.

What is claimed is:

1. A fifth wheel comprising:
a throat adapted to receive a kingpin of a trailer;
a top plate adapted to cover at least a portion of a top of the fifth wheel;
a jaw slidable between a closed position where the jaw blocks removal of a kingpin from the throat and an open position permitting removal of the kingpin from the throat, said jaw having an edge adapted to engage the kingpin positioned in the throat of the fifth wheel when the jaw is in the closed position;
a bias device urging the jaw towards the closed position; and
a mechanism for moving the jaw between the open position and the closed position;
wherein the top plate is configured to allow service and/or replacement of the jaw from the top of fifth wheel while the fifth wheel is assembled to a vehicle.

2. The fifth wheel of claim 1 further comprising a jaw service window in the top plate overlaying a location of the jaw when the jaw is in the open position, wherein the window is sized to allow removal of the jaw from the fifth wheel through the window.

3. The fifth wheel of claim 2 further comprising at least one top wear plate removably attachable to the top plate, wherein the top wear plate covers the jaw service window.

4. The fifth wheel of claim 1 further comprising a release cylinder connected to the top plate of the fifth wheel, wherein the top plate is further configured to allow disconnection of the release cylinder from the top plate from the top of fifth wheel while the fifth wheel is assembled to a vehicle.

5. The fifth wheel of claim 4 further comprising a release cylinder service window in the top plate allowing access to at least one connection point between the release cylinder and the top plate from the top of the fifth wheel while the fifth wheel is assembled to a vehicle.

6. The fifth wheel of claim 5 further comprising at least one top wear plate removably attachable to the top plate, wherein the top wear plate covers the release cylinder service window.

7. The fifth wheel of claim 4 wherein the release cylinder is connected to a bottom surface of the top plate through a quick release mechanism.

8. The fifth wheel of claim 1 further comprising a knockout rod positioned to contact the jaw to loosen the jaw when the jaw is in the closed position, wherein the top plate is further configured to allow service and/or replacement of the knockout rod from the top of fifth wheel while the fifth wheel is assembled to a vehicle.

9. The fifth wheel of claim 8 further comprising a knockout rod service window in the top plate overlaying at least a portion of the knockout rod, wherein the window is sized to allow a user to grip the knockout rod from the top of the fifth wheel while the fifth wheel is assembled to a vehicle.

10. The fifth wheel of claim 9 further comprising at least one top wear plate, wherein the top wear plate covers the knockout rod service window.

11. The fifth wheel of claim 1 further comprising at least one top wear plate removably attachable to the top plate, wherein the top plate is removed before servicing and/or replacing the jaw from the top of the fifth wheel.

12. The fifth wheel of claim 11 wherein the top wear plate includes at least one pry point that allows a user to insert a tool under the edge of the top wear plate to pry the top wear plate from the fifth wheel.

13. The fifth wheel of claim 11 wherein the top wear plate is connected to the top plate via one or more connectors that are removable from a top surface of the wear plate.

14. The fifth wheel of claim 1 wherein the top plate further comprises a tool insert opening for quick removal of bracket pins.

15. The fifth wheel of claim 1 wherein the bias device is a spring.

16. The fifth wheel of claim 15 wherein the spring is connected to a bottom surface of the top plate through a quick release connection.

17. The fifth wheel of claim 16 wherein releasing the quick release mechanism releases tension from the spring.

18. The fifth wheel of claim 1 wherein the bias device or the mechanism for moving the jaw are attached to a bottom surface of the top plate through a quick release mechanism.

19. A fifth wheel comprising:
a throat adapted to receive a kingpin of a trailer;
a top plate adapted to cover at least a portion of the top of the fifth wheel;
a jaw slidable between a closed position where the jaw blocks removal of a kingpin from the throat and an open position permitting removal of the kingpin from the throat, said jaw having an edge adapted to engage the kingpin positioned in the throat of the fifth wheel when the jaw is in the closed position;
a bias device urging the jaw towards the closed position;
a mechanism for moving the jaw between the open position and the closed position;
a top wear plate removably attached to the top plate and covering at least a portion of the top plate, the top wear plate configured to provide a contact surface for engagement with an underside surface of the trailer.

20. The fifth wheel of claim 19 further comprising a wear indicator on the top wear plate configured to indicate a wear status of the top wear plate.

21. The fifth wheel of claim 20 wherein the wear indicator is a groove in a top surface of the top wear plate indicating a maximum wear depth.

22. The fifth wheel of claim 20 wherein the wear indicator is a wear strip embedded in the top wear plate that provides a visual indication of a maximum wear depth.

23. The fifth wheel of claim 19 further comprising a wear indicator on the edge of the jaw adapted to engage the kingpin, the wear indicator configured to indicate a wear status of the edge.

24. The fifth wheel of claim 23 wherein the wear indicator is a groove on a top surface of the jaw positioned to indicate a maximum wear depth of the edge of the jaw.

25. The fifth wheel of claim 23 wherein the wear indicator is a wear strip embedded in the jaw that provides a visual indication of a maximum wear depth of the edge of the jaw.

26. The fifth wheel of claim 19 further comprising:
at least one mouth wear plate removably attached to a side surface of the top plate adjacent to the throat, the mouth wear plate configured to provide a contact surface for engagement with the kingpin as the kingpin is inserted into or removed from the throat; and
a wear indicator on the mouth wear plate configured to indicate a wear status of the mouth wear plate.

27. The fifth wheel of claim 26 wherein the wear indicator is a groove positioned on a visible surface of the mouth wear plate to indicate a maximum wear depth.

28. The fifth wheel of claim 26 wherein the wear indicator is a wear strip embedded in the mouth wear plate that provides a visual indication of a maximum wear depth.

29. The fifth wheel of claim 19 further comprising:
a front jaw removably attached to the top plate, the front jaw having a surface adapted to cooperate with the jaw to engage the kingpin when it is positioned in the throat;
a wear indicator on the front jaw configured to indicate a wear status of the front jaw.

* * * * *